United States Patent [19]
Faruque

[11] Patent Number: 5,815,813
[45] Date of Patent: Sep. 29, 1998

[54] MULTIPATH TOLERANT CELLULAR COMMUNICATION SYSTEM AND METHOD

[75] Inventor: Saleh Faruque, Plano, Tex.

[73] Assignee: Northern Telecom Limited, Quebec, Canada

[21] Appl. No.: 562,391

[22] Filed: Nov. 24, 1995

[51] Int. Cl.⁶ ...................................................... H04B 1/06
[52] U.S. Cl. ........................... 455/446; 455/447; 455/448
[58] Field of Search .................................. 455/33.1, 33.2, 455/33.4, 33.3, 56.1, 56.2, 62, 63, 34.2, 34.1; 379/54, 58, 66

[56] References Cited

U.S. PATENT DOCUMENTS

| | | |
|---|---|---|
| 4,617,573 | 10/1986 | Davidson ................................ 455/33.2 |
| 4,771,448 | 9/1988 | Koohgoli et al. . |
| 4,790,000 | 12/1988 | Kinoshita . |
| 4,975,926 | 12/1990 | Knapp ......................................... 375/1 |
| 5,390,339 | 2/1995 | Bruckert et al. ....................... 455/33.2 |
| 5,483,667 | 1/1996 | Faruque .................................. 455/33.1 |
| 5,603,083 | 2/1997 | Lee ......................................... 455/33.1 |

*Primary Examiner*—Tommy P. Chin
*Assistant Examiner*—Anand S. Rao
*Attorney, Agent, or Firm*—Finnegan, Henderson, Farabow, Garrett & Dunnar, L.L.P.

[57] ABSTRACT

A method for deploying a PCS system wherein radio transceivers are deployed at spacings which correspond to a diameter of a first Fresnel zone and set output powers of the transceivers to define cells which correspond to the first Fresnel zone of the transceivers. A PCS system having radio transceivers deployed at spacings corresponding to a diameter of a first Fresnel zone and operating at output powers which define cells corresponding to the first Fresnel zones of the transceivers. A handoff area surrounds the first Fresnel zone breakpoint.

4 Claims, 7 Drawing Sheets

MULTIPATH TOLERANT CELLULAR COMMUNICATION SYSTEM AND METHOD

BACKGROUND OF THE INVENTION

1. Field of Invention

The present invention relates to cellular communication; and more particularly, to a method and system for deployment of transceivers and their respective antenna in personal communication and $\mu$-cellular systems and services.

2. Description Of Related Art

Personal Communications Systems (PCS) and microcellular systems, which are relatively low powered cellular communication systems are installed in both outdoor and indoor environments. These systems include a plurality of radio transceivers and their corresponding antenna, a telecommunications switch for interconnecting the transceivers, and for connecting the transceivers to a telephone network, and a plurality of portable terminals, carried by the subscribers, which communicate with other mobile units or telephones via the transceivers. Typically, the transceivers are distributed in highly populated areas, such as industrial complexes, college campuses, hospital complexes, and office or apartment buildings. The transceivers and their associated antennae are placed throughout a complex and/or a building so as to provide good radio coverage of the entire building or complex with enough radio channels to handle the telecommunications traffic in each region or area thereof.

In typical indoor environments, where conventional PCS radio transceivers are operated at about 10 mW output power, the radio propagation characteristics are strongly affected by structural characteristics of the building and characteristics of its contents. This makes it very difficult to predict the radio propagation characteristics so that radio transceivers can be optimally placed for good radio coverage at minimum cost. Attempts have been made to model radio propagation characteristics empirically based on observable characteristics of the indoor environment, but none of these provide very reliable results. The indoor environments are simply too difficult to characterize in a manner that permits accurate predictions to be made. Radio deployment in and around buildings and complexes of buildings require the mobile units and the transceivers to operate in a multipath environment. Such an environment causes unsatisfactory and chaotic fuzzy operation owing to numerous RF barriers and scattering phenonema that vary from one civil structure to another. Although computer aided prediction tools greatly enhances RF deployment in the highly populated building complex environment, these tools are generally expensive for PCS and $\mu$-cellular services. Additionally, building codes vary from place to place, requiring wide-ranging data bases for such computer-aided prediction tools.

Moreover, available software prediction tools require user defined clutter factors, thereby introducing impurities into the data base. As a result, the PCS and micro-cellular systems that are deployed by means of traditional methods either operate in a substandard manner because of inaccuracy, or the installed system is inordinately expensive.

Consequently, deployment of PCS radio transceivers in indoor environments often requires a time consuming "trial and error" approach. The cost of the deployment operation is typically 25% to 33% of the total cost of the installed PCS or micro-cellular system.

In view of the foregoing, there is a need for a low power cellular system and method of determining the proper location of the transceivers and their respective antenna that is simple and inexpensive to implement, yet is not affected by multipath phenomena, regardless of the propagation medium.

SUMMARY OF THE INVENTION

Accordingly, the present invention is directed to a low power cellular system that is not affected by multipath interferences together with a method of deploying the plurality of transceiver antenna that is simple and inexpensive to implement.

The present invention is advantageous in that it provides a system that is multipath tolerant, provides smooth handoff, reduces ping-pong, enhances capacity, consumes considerably less power and provides a simplified, cost-effective deployment process.

Additional features and advantages of the invention will be set forth in the description which follows, and in part will be apparent from the description, or may be learned by practice of the invention. The objectives and other advantages of the invention will be realized and attained by the method and system particularly pointed out in the written description and claims hereof as well as the appended drawings.

To achieve these and other advantages and in accordance with the purpose of the invention, as embodied and broadly described, the invention is a method of configuring a communication system having a plurality of transceivers for transmitting and receiving predetermined RF frequencies to and from mobile units, each transceiver having an antenna for radiating and collecting the respective RF frequencies. The method includes providing each of said plurality of transceivers with output power defining a cell substantially corresponding to a first Fresnel zone of the RF frequencies; and deploying said transceiver antennae a distance from one another no greater than the diameter of the first Fresnel zone.

In another aspect, the invention includes a cellular communication system which has a plurality of transceivers for transmitting and receiving predetermined RF frequencies to and from mobile units. Each of the plurality of transceivers has an antenna for radiating and collecting the respective RF frequencies, each of said plurality of transceivers having output power defining a cell corresponding substantially to a first fresnel zone of the RF frequencies, said transceiver antennae being spaced from one another a distance substantially corresponding to the diameter of the first Fresnel zone.

It is understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention and together with the description serve to explain the principles of the invention.

DESCRIPTION OF THE PREFERRED EMBODIMENT

The present invention includes the discovery that individual cells of cellular communication systems that have a radius which approximately corresponds to or is less than the first Fresnel zone is insensitive to multipath interference, regardless of the propagation media, especially for low power Micro-Cellular and PCS systems. A Fresnel zone is defined as any one of an array of concentric surfaces in space between a transmitter and a receiver over which the increase in distance over the straight line path is equal to some multiple of one-half wavelength. According to the sixth edition of Van Nostrand's Scientific Encyclopedia, Fresnel zones are of importance in studying interference lobes produced by the interaction of a direct and a surface-reflected wave; and that for a given path, reflected radio energy arriving at the receiver from any point along any of the surface Fresnel zones is 180 degrees out of phase with the direct wave, thereby producing destructive or constructive interference as the multiple is odd or even, respectively. Based upon such discovery, the invention further includes a simple and cost effective method for determining the radius of the individual cells within such Fresnel zone for both indoor and outdoor locations by using a combination of parameters, for which the cell remains within the Fresnel zone break point. In this region, the path loss slope is similar to free space ($\gamma \approx 2$) irrespective of the propagation medium. Consequently, a cell whose radius is within this region remains insensitive to the propagation medium, since diffraction and other scattering phenomena occur beyond the first Fresnel zone break point. Empirical formulae are used to predict cell radii for indoor and outdoor PCS, requiring virtually no computer-aided prediction tools.

A propagation model, based on a three-ray model in conjunction with a Fresnel zone break point directly computes the cell radius as a function of frequency, antenna height, Effective Radiated Power (ERP) and hand-off threshold, for which the cell radius is always within the Fresnel zone break point and remains insensitive to the variations of propagation environment. The radii available within the Fresnel zone break point according to the present invention, which are appropriate for low power PCS and Micro-Cellular services, offer greatly simplified and cost-effective deployment of the transceiver antennae.

Figure 1:
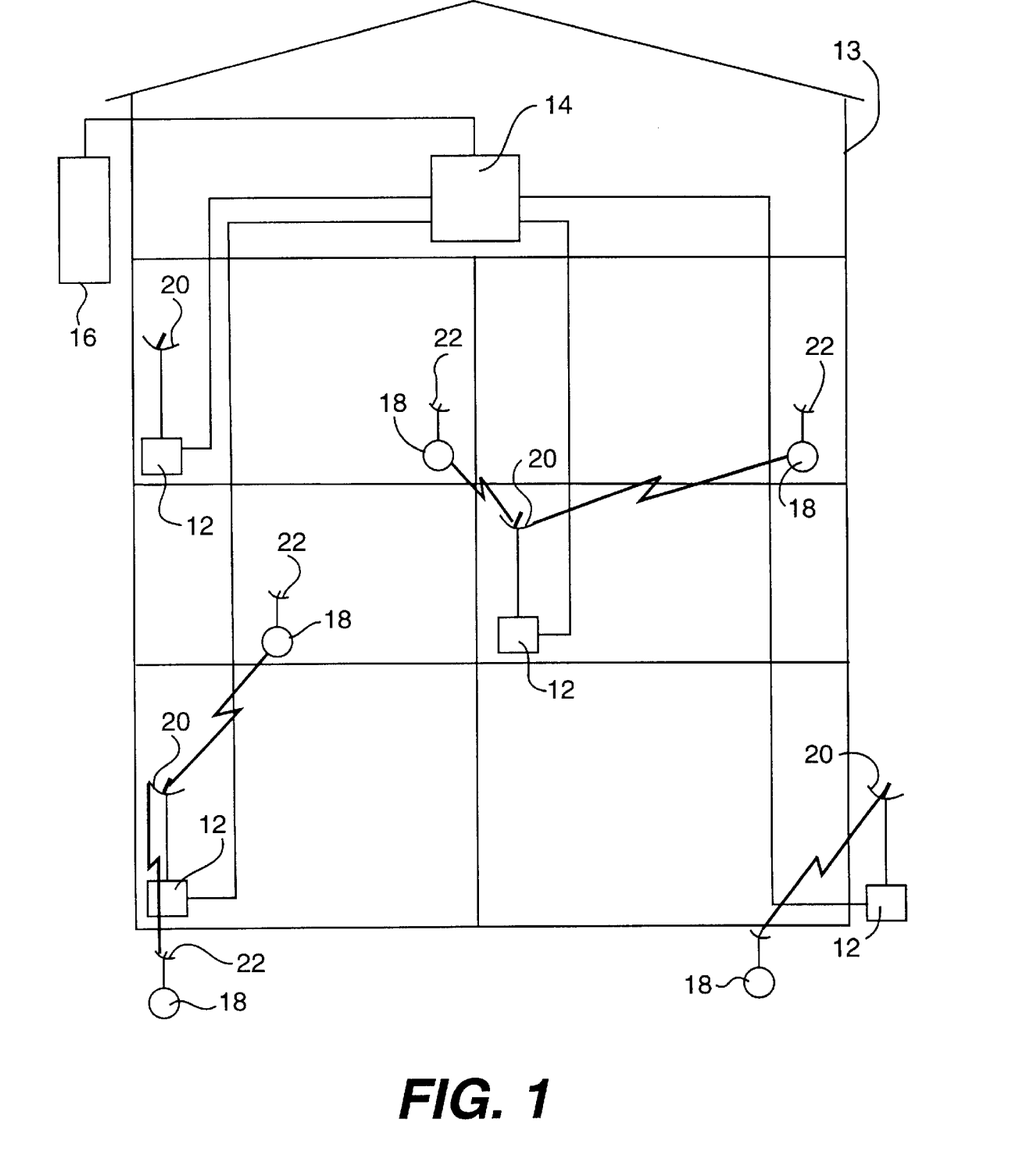
FIG. 1 is a block diagram of a personal communication system with the transceivers deployed in accordance with the present invention.

Referring to FIG. 1, a PCS system is made up of a plurality of radio transceivers 12, which may be installed in or outside of a building 13. A telecommunication switch 14 connects the individual transceivers 12 to a public telephone switching network 16. Mobile units 18 communicate with the particular transceiver 12 depending on its location within or without the building 13. Each of the transceivers 12 has an antenna 20, and each of the mobile units has an antenna 22.

Ceiling height plays an important role in determining the antenna height and the path difference. Assuming that the transceivers are located in a building, and referring to FIG. 2, a propagation medium having ground reflections as well as reflections from the ceiling are shown where H=Ceiling height, $h_1$=Transmit antenna height, $h_2$=Receive antenna height, d=Antenna separation, D=Direct path, $d_1$=Ground reflected path, and $d_2$=Ceiling reflected path.

Figure 2:
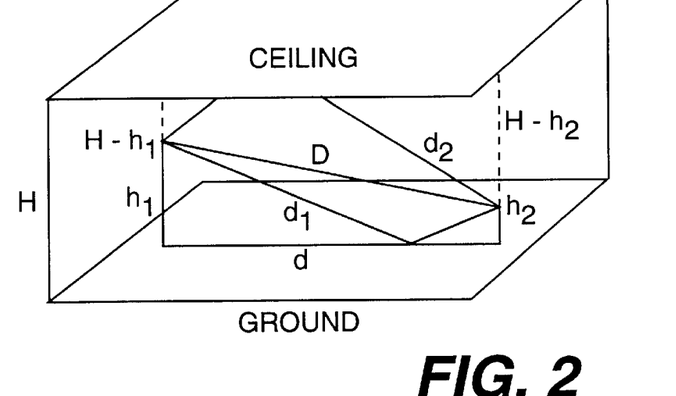
FIG. 2 depicts a three ray indoor propagation model having a set of parameters for which a cell of PCS and micro-cellular systems remains within a fresnel zone breakpoint in accordance with the present invention.

The path differences between the direct and the reflected path can be estimated as, $$\Delta d_1 = [(h_1+h_2)^2 = d^2]^{1/2} - [(h_1-h_2)^2 + d^2]^{1/2} \quad (1)$$

$$\Delta d_2 = [\{(H-h_1)+(H-h_2)\}^2 + d^2]^{1/2} - [\{(H-h_1)-(H-h_2)\}^2 + d^2]^{1/2} \quad (2)$$

where $\Delta d_1 = d_1 - D$, and $\Delta d_2 = d_2 - D$

After some algebraic manipulation, eq.1 and eq. 2 may be expressed as, $$\Delta d_1 = \frac{4h_1 h_2}{d[\{(h_1+h_2)/d\}^2 + 1]^{1/2} + d[\{(h_1+h_2)/d\}^2 + 1]^{1/2}} \quad (3)$$

$$\Delta d_1 = \frac{4(H-h_1)(H-h_2)}{d[\{(2H-h_1-h_2/d\}^2 + 1]^{1/2} + d[\{(h_2+h_1)/d\}^2 + 1]^{1/2}} \quad (4)$$

Since $(h_1 \pm h_2)/d << 1$ and $2H - h_1 - h_2 << 1$ we obtain $$\Delta d_1 = 2h_1 h_2/d \quad (5)$$

$$\Delta d_2 = 2(H-h_1)(H-h_2)/d \quad (6)$$

For simplicity, it is desirable to have identical path differences, i.e.

$$\Delta d_1 = \Delta d_2 = \Delta d = \quad (7)$$

for which we obtain the following identity:

$$H = h_1 + h_2 \quad (8)$$

The composite path difference then appear as $$\Delta d = 2(H-h_2)h_2/d \quad (9)$$

which is a function of the ceiling height. Moreover, the transmit antenna height is also determined by the ceiling height.

Figure 3:
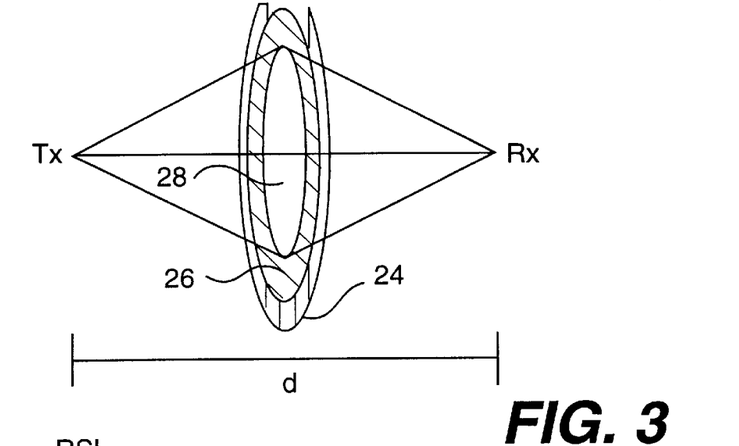
FIG. 3 depicts fresnel zones upon which deployment of the transceiver antennae of the present invention are based.

Referring to FIG. 3, Fresnel zones are composed of circular cross sections of an electromagnetic wavefront, divided into zones of concentric circles, referred to as 24, 26, and 28, for example, separated by $\lambda/2$. In a multipath environment, diffraction of radio waves occur when an electromagnetic wave front encounters an obstruction. The path difference between these components and the direct ray is always $n\lambda/2$ where n=1 for the first Fresnel zone 28, n=2 for the second Fresnel zone 26, and 3rd Fresnel zone 24 etc. Within the first Fresnel zone 28, this path difference is exactly $\lambda/2$, for which the diffraction is maximum. Thus from eq. 9 we write, $$2(H-h_2)h_2/d = \lambda/2 \quad (10)$$

resulting in $$d_0 = d = 4(H-h_2)h_2/\lambda \text{ (Indoor)} \quad (11)$$

Figure 4:
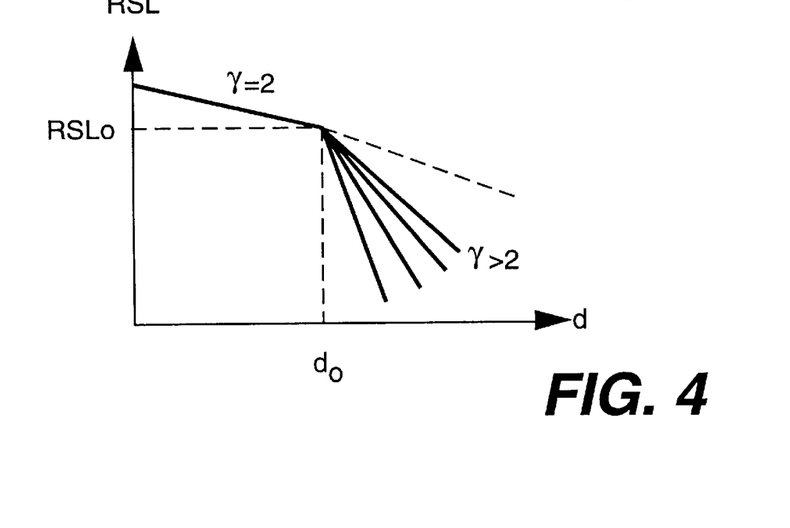
FIG. 4 is a diagram depicting the breakpoint of a first fresnel zone upon which the boundary of each cell of the system of FIG. 1 is based in accordance with the present invention.

The corresponding distance for the outdoor model can be derived from eq. 11 by setting $H=h_1+h_2$ i.e., $$d_0=d=4h_1h_2/\lambda \text{ (Outdoor)} \qquad (12)$$

which is essentially due to a two-ray model. This distance ($d_0$) is known as the Fresnel zone break point.
Referring to FIG. 4, RSL=received signal level, and $RSL_0$=received signal level at the breakpoint $d_0$.

The path loss slope ($\gamma$) within this region is constant, irrespective of the propagation medium where $\gamma=2$ before the fresnel zone break point and $\gamma>2$ after the break point as shown in FIG. 4. Consequently, a cell whose radius is within this region remains insensitive to the propagation medium, since diffraction and other scattering phenomena occur beyond the Fresnel zone break point.

From the equation of a straight line with $RSL_0$ Receive Signal Level as the intercept at $d_0$, and $\gamma$ as the slope beyond do (see FIG. 4), we obtain:

$$RSL=RSL_0-10\gamma\log(d/d_0) \qquad (13)$$

$\gamma$=Attenuation slope
Solving for d, we obtain the cell radius as a function of Fresnel zone break point:

$$d=d_0 10^{(RSL0-RSL)/10\gamma} \qquad (14)$$

The exponent in eq. 14 vanishes for $RSL_0$=RSL and the cell radius reduces to $d_0$. In this region, the cell is insensitive to the propagation environment where the RF signal attenuates gracefully with $\gamma=2$. The path loss $PL_0$ and the corresponding $RSL_0$ within this region can now be obtained from the free space path loss formula as $$PL_0(\text{Path Loss})=32.44+20\log(F)+20\log(d_0) \qquad (15)$$

$$RSL_0(d=d_0)=ERP-PL_0 \qquad (16)$$

Combining eq.15 and eq.16, we obtain $$RSL_0=ERP-\{32.44+20\log(F)+20\log d_0)\} \qquad (17)$$

Substituting eq.17 into eq.14, we obtain the general prediction formula as:

$$d=d_0\cdot 10^{[ERP-[32.44+20\log(F)+20\log(d0)]-RSL]/10\gamma} \qquad (18)$$

An inspection of eq. 18 reveals that there exists three operating conditions namely, (i) The exponent of eq.18 is +ve, for which d decreases with $\gamma$; this condition may be classified as multipath attenuation, (ii) The exponent of eq.18 vanishes, for which d(=do) is insensitive to $\gamma$; this condition may be classified as multipath tolerance, and (iii) The exponent of eq.18 is –ve, for which d increases with $\gamma$; this condition may be classified as multipath gain. These operating conditions are briefly described as follows.

Multipath attenuation is due to destructive interference beyond the Fresnel zone break point where the reflected and diffracted components are 180 deg. out of phase. Under this condition the link budget can be calculated by setting the exponent of eq. 18 to +ve, i.e, $$[ERP-\{32.44+20\log(F)+20\log(d_0)\}-RSL]/10\gamma>0 \qquad (19)$$

for which, $d>d_0$ and the coverage becomes sensitive to $\gamma$. Today's cellular communication systems largely falls into this category. There is a unique combination of design parameters for which the exponent of eq.18 vanishes. The corresponding link budget becomes:

$$ERP=32.44+20\log(F)+20\log(d_0)+RSL \qquad (20)$$

and the coverage reduces to:

$$d=d_0=4h_1h_2F/C \text{ (Outdoor)} \qquad (21)$$

$$d=d_0=4(H-h2)h_2F/C) \text{ (Indoor)}$$

where $H=h_1+h_2$. These are the proposed radii for indoor and outdoor PCS which are multipath tolerant.

Multipath gain is due to wave guide effect where multiple reflections form a composite signal which is stronger than the corresponding signal from free space loss. Under this condition, the link budget can be calculated by setting the exponent of eq.18 to –ve:

$$[ERP-\{32.44+20\log(F)+20\log(d_0)\}-RSL]/10\gamma<0 \qquad (22)$$

for which, $d<d_0$. The path loss slope under this condition is generally <2, which means that propagation is better than free space. Path loss slope as low as 1.7 has been reported recently.

Figure 5:
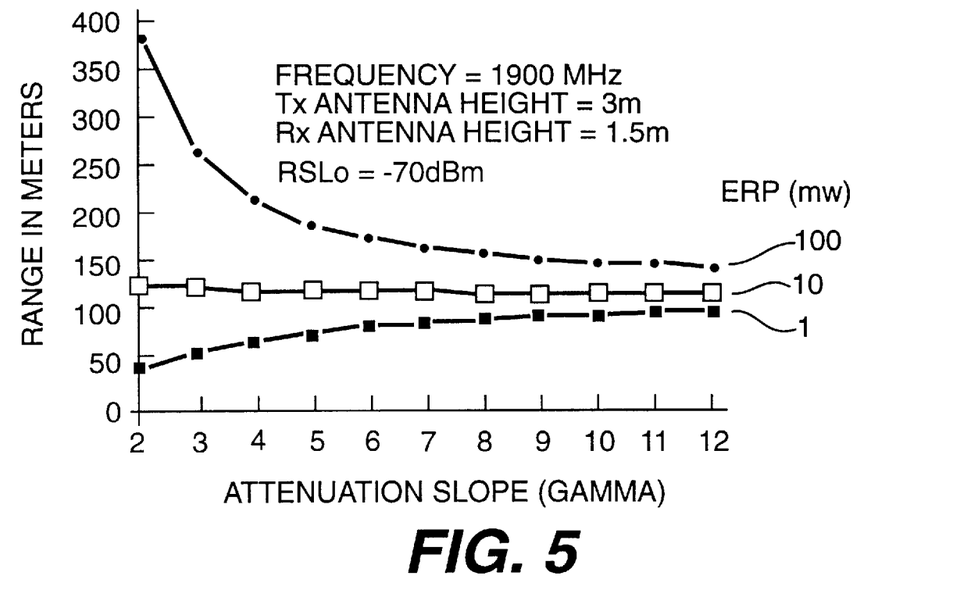
FIG. 5 is a graph of the radii of an indoor cell as a function of the attenuation slope of the transmitted signal using the parameters of FIG. 2.
Figure 6:
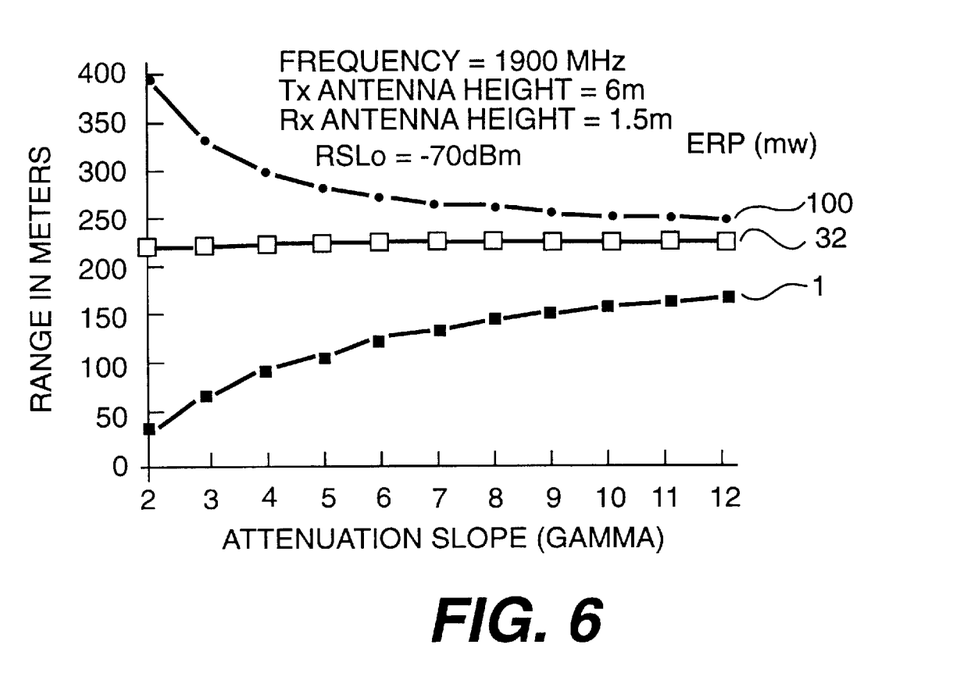
FIG. 6 is a graph of the radii of an outdoor cell as a function of the attenuation slope of the transmitted signal using the parameters of FIG. 2 with twice the transmit antenna height of FIG. 5.

Using the following set of indoor parameters: Ceiling height H=4.5 m, h2=1.5 m(Fixed), hi=4.5−1.5=3 m (Fixed), F=1900 MHz, RSL=−70 dBm we obtain a set of curves shown in FIG. 5 The ERP for which the cell is insensitive to propagation medium is only 10 mW. The corresponding cell radius is 114 meters. For the same design parameters with twice the transmit antenna height (6 m), the outdoor cell acquires twice the coverage (228 m) without loss of generality as shown in FIG. 6. The corresponding ERP=32 mw. Clearly, the power requirement, in both cases, are well below the traditional design. This is due to free space path loss within the fresnel zone break point. We also notice in FIGS. 5 and 6 that, in both indoor and outdoor, the cell becomes gradually more sensitive to the propagation medium as the transmit power increases. This is due to multipath fading beyond the break point. The wave guide effect is also plotted in FIGS. 5 and 6, showing coverage gain in multipath environments.

Referring to eq.18 and equating the exponent to zero, we obtain the cell radius as shown in eq. 21 which is independently of $\gamma$. The available cell radii are well suited for PCS and $\mu$-cellular services; requiring no computer aided design tools. The corresponding link budget is given in eq. 20.

Receiver sensitivity is a measure of its ability to detect a weak signal. It is generally determined by the receiver thermal noise threshold (Pt):

$$P_t=10\log(K.T.\,BW.\,NF)=10\log(KT)+10\log(BW)+NF(dB)=-204dB+10\log(BW)+NF(dB) \qquad (23)$$

where
  K=Boltzmann constant $(1.3805\times10^{-23}$ J/K)
  T=Absolute temperature(290° K)
  BW=Transmission bandwidth
  NFdB=Receiver noise figure
For analog radio, it is determined by the following equation:

$$C/N=RSL-P_t$$

where $$P_t=-204+10\log(BW)+NF$$

Therefore $$C/N=RSL+204-10\log(BW)-NF \qquad (24)$$

Substituting for RSL from eq.20, we obtain, $$C/N=ERP-\{32.44+20\log(F)+20\log(d_0)\}+204-10\log(BW)-NF \qquad (25)$$

Thus for a given C/N, a large noise figure can be tolerated by increasing the ERP by the same amount. It follows that a given cell can be operated well above the receiver thermal noise threshold without loss of generality.

For digital radio, the performance is generally determined by Eb/No given by, $$E_b/N_0 = \frac{(RSL)/r_b}{N_0} = \frac{RSL}{r_b N_0}$$

where $E_b$=Energy per bit
$N_0$=Noise spectral density
RSL=Received signal level
$R_b$=Bit rate In decibel, this may be expressed as, $$E_b/N_0 = RSL(\text{dB}) - 10\log(r_b) - 10\log(N_0)$$
$$= RSL(\text{dB}) - 10\log(r_b) + 204\text{dB} - NF(\text{dB})$$

Substituting for RSL, the above equation can be expressed as, $$Eb/No = ERP - \{32.44 + 20\log(F) + 20\log(d_o)\} - 10\log(r_b) + 204 - NF_{dB} \quad (26)$$

Thus for a given Eb/No, a large noise figure can be tolerated simply by increasing the ERP by the same amount.

Since path loss slope within the Fresnel zone break point is 2, irrespective of the propagation medium, the required ERP within this region is very low; thus enhancing the battery life.

Figure 7:
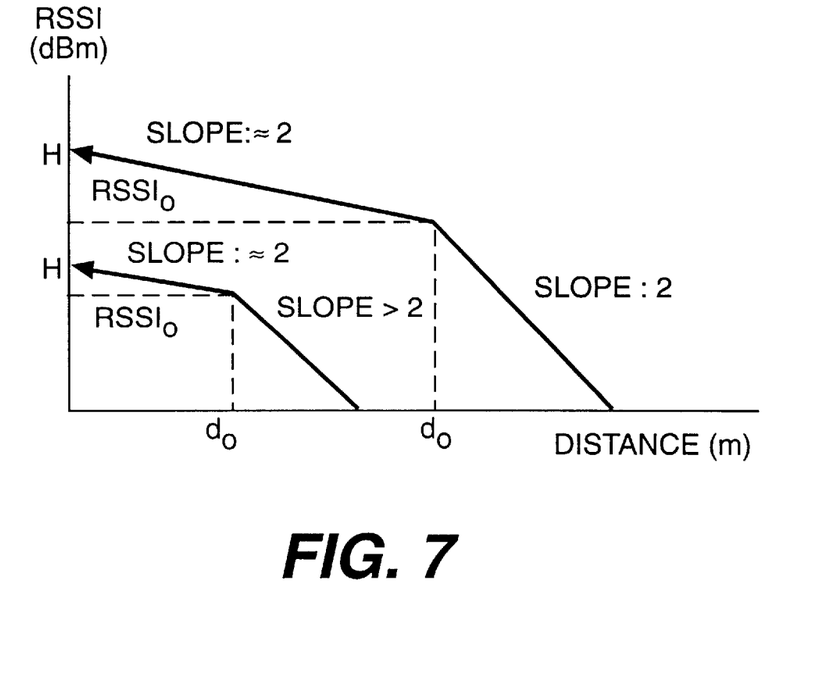
FIG. 7 is a graph depicting the received signal strength as a function of distance for two antenna heights.
Figure 8:
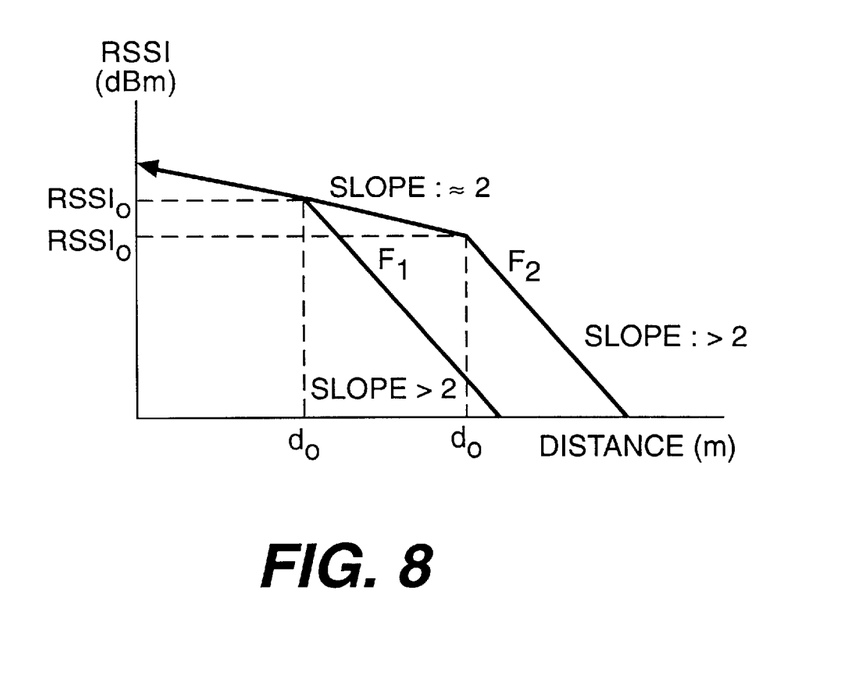
FIG. 8 is a graph depicting the received signal strength as a function of distance for two frequencies.

Referring to FIG. 7, the method of the present invention may also be expressed as a combination of antenna height, transmit frequency, transmit power, and cell radius for maintaining the cell within the first Fresnel zone break point. In this region, the path loss slope is similar to free space (=2) irrespective of the propagation medium. Consequently, a cell whose radius is within this region remains insensitive to the variation of propagation medium, since diffraction and other scattering phenomena occur beyond the first Fresnel zone break point. As shown in FIG. 7 where the receiver signal strength indicator (RSSI) is plotted as a function of distance for different antenna heights H. there is a graceful attenuation of signals before the break point $d_0$ while $d_0$ varies with the antenna height. After the break point $d_0$, the signal attenuates faster because of diffraction, scattering and multipath fading beyond $d_0$. As shown in FIG. 8, the break point also depends on frequency. Evidently, the break point depends on antenna height as well as on frequency. This first Fresnel zone break point $(d_0) \approx 4h_1 h_2 F/C(1)$ where $d_0$=Distance between the base station and the first Fresnel zone, $h_1$=Base station antenna height, $h_2$=Mobile antenna height, F=Frequency, and C=Velocity of light.

Thus for a given frequency and antenna height, a cell can be placed within the first Fresnel zone break point by adjusting the transmit power and the cell boundary. The method of the present invention directly computes the cell radius as a function of frequency, antenna height, power and cell boundary for which the cell is always within the first Fresnel zone boundary and remains virtually insensitive to the variation of propagation medium.

Figure 9A:
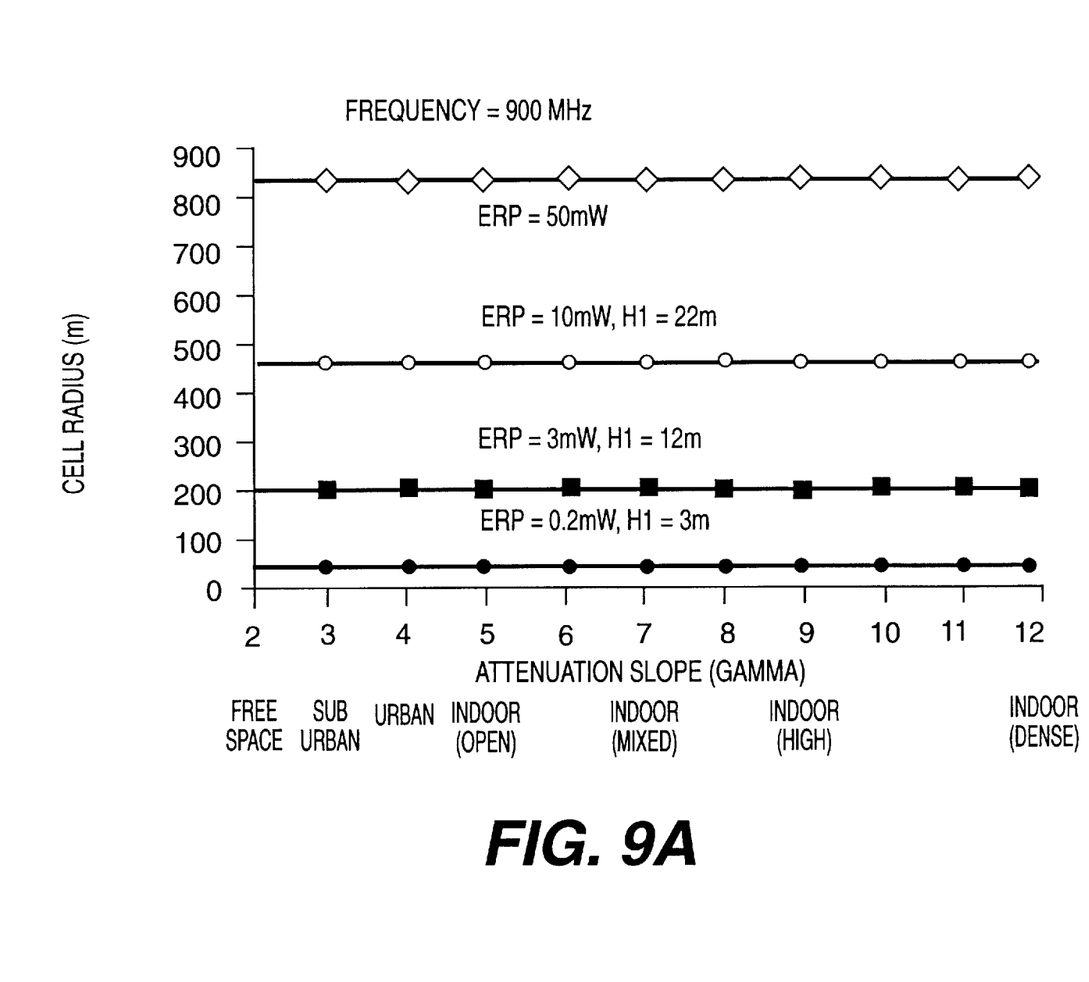
FIG. 9 is a graph showing cell radii within the first Fresnel zone as a function of propagation medium.
Figure 9B:
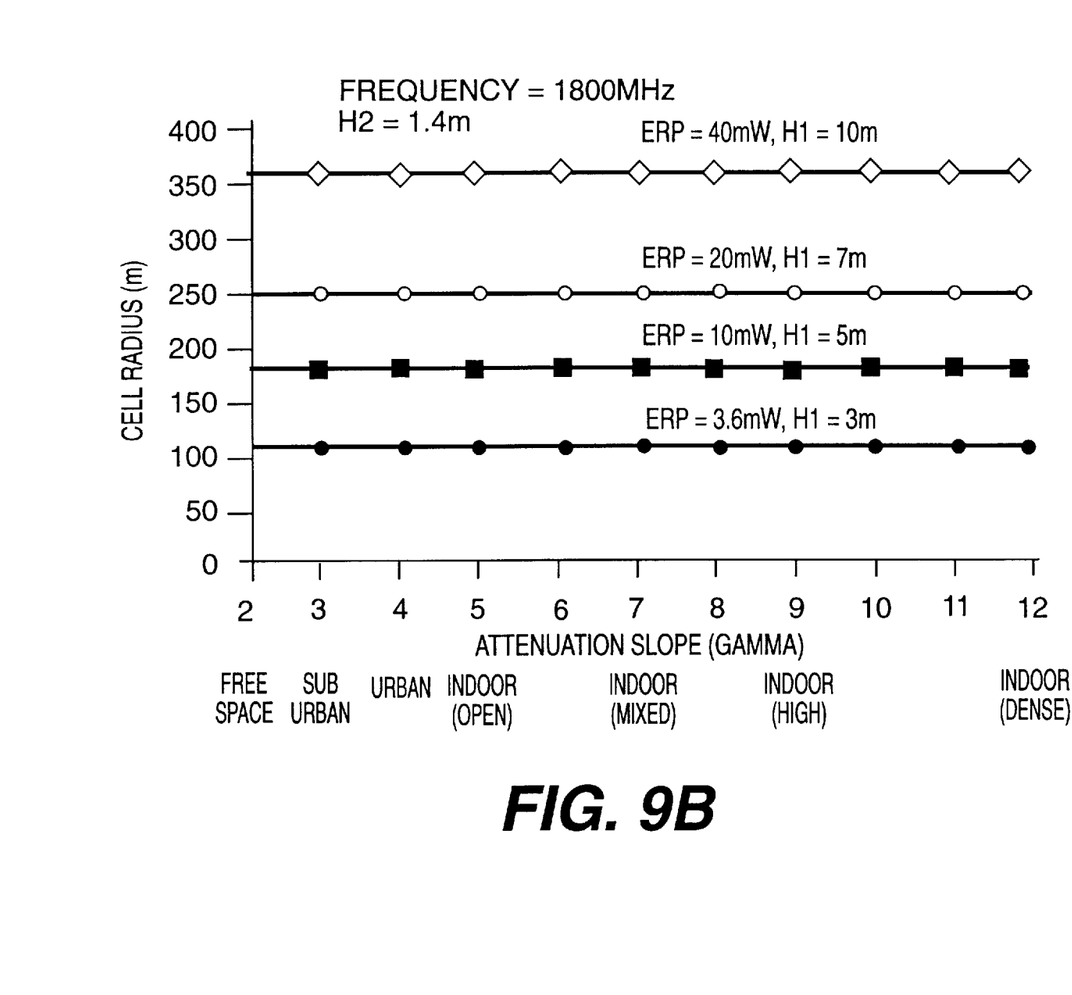

This is illustrated in FIG. 9 for several combinations of design parameters.

It directly computes the cell radius as a function of frequency, antenna height, ERP and handoff threshold, for which the cell radius is always within the first fresnel zone boundary and remains virtually insensitive to the variations of propagation environment. The radii available within the Fresnel zone boundary are appropriate for low power PCS and Micro-Cellular services, offering a greatly simplified deployment process. Moreover, it does not require customer or site information and can be easily used by general trade people having no RF experience. We have determined that the radio propagation characteristics are very predictable close to the radio transceivers, and only become difficult to predict at distances which are far enough from the radio transceivers that multipath interference effects become significant. It is the multipath interference effects that are difficult to predict.

Figure 10:
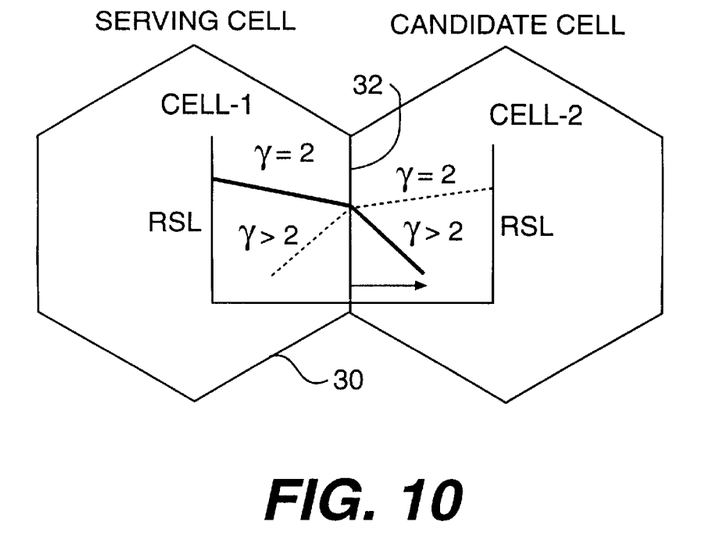
FIG. 10 is a diagram depicting the hand-off of a mobile unit from a serving cell to a candidate cell in a system where the transceivers are deployed in accordance with the present invention.

Hand-off is a process which allows a cellular mobile move from cell to cell without service interruption. Referring to FIG. 10, a mobile unit 30 is shown crossing a cell boundary 32, and experiences a rapid attenuation of RSL from the serving cell. As a result, a decisive and prompt hand-off will take place. Once the hand-off is complete, a ping-pong effect is highly unlikely since the difference of RSL between the old and the new cell increases rapidly. This will also unload the mobile switch from too many hand-off requests, enhancing the capacity of the system.

Figure 11:
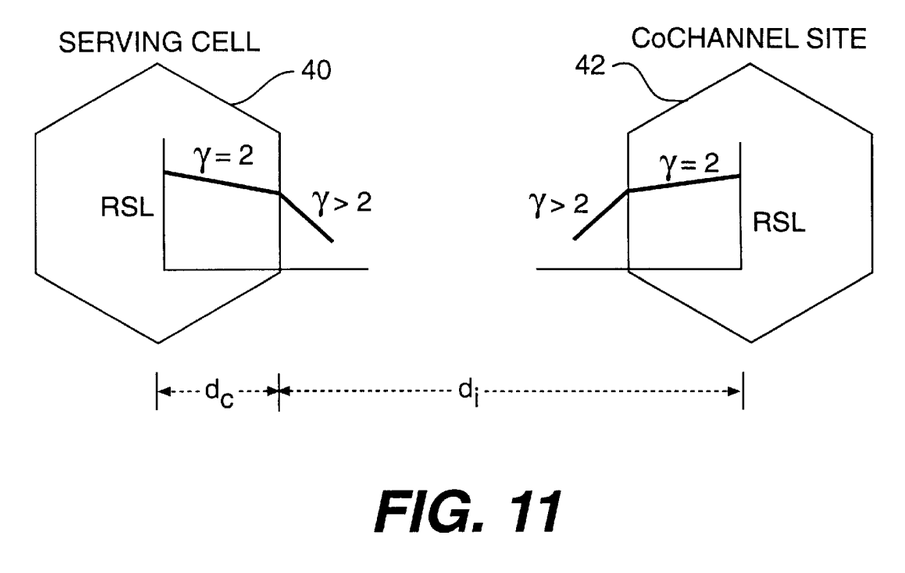
FIG. 11 is a diagram depicting co-channel interference between non-adjacent cells.

Interference is a major problem in cellular communication systems due to frequent reuse of channels (co-channel interference). With the present invention, this problem is greatly reduced due to properties inherent in the system. Referring to FIG. 11, a pair of cells 40 and 42 are separated by a repeat distance $d_i$; $d_c$ being the cell radius, as shown in FIG. 11. Since the cochannel site is located beyond $d_c$, it's signal at the serving site will suffer multipath attenuation. Assuming six co-channel sites, the C/I prediction equation can be modified as, $$C/I = 10\log\{(1/6)d_c^2/(d_i^{-(2+\Delta\gamma)})\} \quad (27)$$

In multipath environment $\gamma > 2$ ($\Delta\gamma > 0$) beyond the fresnel zone break point. As a result the C/I performance is greatly enhanced in multi path environment. Stated differently, for a given C/I ratio, a channel can be repeated more often, enhancing the system capacity.

We calculated the radius of the first Fresnel zone of the indoor environment in which we are deploying the system and set the output power of the radio transceivers so that the cells served by the transceivers have a radius which is less than or equal to the Fresnel radius. For a typical indoor environment, the appropriate output power of the transceivers is less than 1 mW, much less than the output power used in conventional indoor PCS systems. Because the radio propagation characteristics are so predictable when the cells coincide with the first Fresnel zones, deployment is simply a matter of setting the output powers to the calculated values and distributing the radio transceivers at the calculated regularly spaced intervals. This results in a significant reduction in deployment cost.

Because the cells in such a system are somewhat smaller than in conventional indoor PCS systems, there may be some increase in equipment costs. However, the increased equipment costs are not as large as may first appear. The smaller cells are likely to need fewer transceivers per cell to meet traffic requirements, so the overall increase in the number of transceivers is not large. Most of the increased equipment cost is for additional antennas, and these are relatively cheap.

Moreover, the deployment savings (up to 50% of the deployment costs) are significant enough to offset these additional equipment costs in many applications, and the operation of the resulting system may be more robust in many applications.

There are further benefits to setting the cell radius close to the radius of the first Fresnel zone. When this is done, the propagated power drops rapidly after the cell boundaries facilitating handoffs and reducing intercell interference, so that a relatively high rate of frequency re-use is feasible.

The low power requirements for such small cells also lengthen the battery life for the portable terminals and may allay health concerns related to higher power transmission.

The same idea can also be applied to outdoor systems, but in this case, the formula for calculating the radius of the first Fresnel zone and the transmission power required to align the cell radius with the Fresnel zone radius is somewhat different as hereinbefore described.

It will be apparent to those skilled in the art that various modifications and variations can be made in the system and method of the present invention without departing from the spirit or scope of the invention. Thus, it is intended that the present invention cover the modifications and variations of this invention provided they come within the scope of the appended claims or their equivalent.

What is claimed is:

1. A cellular communication system, comprising:

a plurality of transceivers for transmitting and receiving predetermined RF frequencies to and from mobile units, each of said plurality of transceivers having an antenna for radiating and collecting the respective RF frequencies and having output power defining a cell corresponding substantially to a first Fresnel zone of the RF frequencies;

each of said transceiver antennae being spaced from one another a distance substantially corresponding to the diameter of the first Fresnel zone;

each of said cells having a boundary which forms an annulus of attenuated radiated power and the annulus surrounding each cell overlaps adjacent cells; and each boundary of said cell substantially coincides with the first Fresnel zone breakpoint determined by the equation: $d_0 = d = 4h_1 h_2 / \lambda$ where $d_0$ is the first Fresnel zone breakpoint, d is the distance between the transceiver antenna and the mobile antenna, $h_1$ is the height of the transmit antenna, $h_2$ is the height of the receive antenna, and $\lambda$ is the wavelength of the RF frequencies.

2. A method of configuring a communication system having a plurality of transceivers for transmitting and receiving predetermined RF frequencies to and from mobile units, each transceiver having an antenna for radiating and collecting the respective RF frequencies, said method, comprising:

providing each of said plurality of transceivers with output power defining a cell substantially corresponding to a first Fresnel zone of the RF frequency; and deploying said transceiver antennae at a distance from one another no greater than the diameter of the first Fresnel zone, said distance defined by: $d_0 = d = 4h_1 h_2 / \lambda$, where $d_0$ is the first Fresnel zone breakpoint, d is the distance between the transceiver antenna and the mobile antenna at the periphery of the cell, $h_1$ is the height of the transmit antenna, $h_2$ is the height of the receive antenna, and $\lambda$ is the wavelength of the RF frequency.

3. A cellular communication system, comprising:

a plurality of transceivers for transmitting and receiving predetermined RF frequencies to and from mobile units, each of said plurality of transceivers having an antenna for radiating and collecting the respective RF frequencies and having output power that defines a cell corresponding substantially to a first Fresnel zone of the RF frequencies, said transceiver antennae being spaced from one another a distance substantially corresponding to a diameter of the first Fresnel zone;

each of said cells having a boundary substantially coinciding with a breakpoint in the first Fresnel zone to form an annulus of attenuated radiated power surrounding each cell and overlapping an adjacent cell, the plurality of transceiver antennae being located within a building enclosure having different propagation media, wherein the first Fresnel zone breakpoint is determined by the equation: $d_0 = d = 4(H - h_2)h_2 / \lambda$ wherein $d_0$ is the first Fresnel zone breakpoint, d is the distance between the transceiver antenna and a mobile antenna, $h_2$ is the height of the mobile antenna, H is the ceiling height of the building enclosure and is equal to the sum of $h_1$ and $h_2$, $h_1$ is the height of a transmit antenna, and $\lambda$ is the wavelength of the RF frequency.

4. A method of configuring a communication system having a plurality of transceivers for transmitting and receiving predetermined RF frequencies to and from mobile units, each transceiver having an antenna for radiating and collecting the respective RF frequencies, the method comprising the steps of:

providing each of the plurality of transceivers with output power defining a cell substantially corresponding to a first Fresnel zone of the RF frequency; and deploying the transceiver antennae at a distance from one another no greater than the diameter of the first Fresnel zone, the plurality of transceivers and antennae being located within a building enclosure having different propagation media, the step of deploying the transceiver antennae including the substep of determining the first Fresnel breakpoint in accordance with the following equation: $d_0 = d = 4(H - h_2)h_2 / \lambda$, wherein $d_0$ is the first Fresnel zone breakpoint, d is the distance between the transceiver antenna and the mobile antenna, $h_2$ is the height of the mobile antenna, H is the ceiling height of the building enclosure and is equal to the sum of $h_1$ and $h_2$, $h_1$ is the height of the transmit antenna, and $\lambda$ is the wavelength of the RF frequency.

* * * * *